United States Patent [19]

Bruke

[11] Patent Number: 4,779,528

[45] Date of Patent: Oct. 25, 1988

[54] FLOATING SHAFTLESS HELIX SCREW PRESS

[75] Inventor: Richard L. Bruke, Vintrie, Sweden

[73] Assignee: Spirac Engineering AB, Malmo, Sweden

[21] Appl. No.: 920,698

[22] Filed: Oct. 17, 1986

[30] Foreign Application Priority Data

Oct. 18, 1985 [SE] Sweden ............................ 8504932-8

[51] Int. Cl.[4] .......................... B30B 9/12; B65G 33/22

[52] U.S. Cl. .................................... 100/117; 100/127; 100/145; 100/148

[58] Field of Search ............... 100/117, 147, 148, 150, 100/145, 127, 149, 935; 425/208

[56] References Cited

U.S. PATENT DOCUMENTS

| | | | |
|---|---|---|---|
| 2,765,899 | 10/1956 | Ballard | 100/145 X |
| 3,062,129 | 11/1962 | Wand et al. | 100/147 X |
| 3,230,902 | 1/1966 | Grimm et al. | 100/117 |
| 3,760,717 | 9/1973 | DeMilt et al. | 100/147 X |
| 4,256,035 | 3/1981 | Neufeldt | 100/145 |
| 4,498,382 | 2/1985 | Pera et al. | 100/148 X |
| 4,503,764 | 3/1985 | Koch et al. | 100/117 |
| 4,520,724 | 6/1985 | Costarelli | 100/117 X |
| 4,581,992 | 4/1986 | Koch | 100/117 |
| 4,655,128 | 4/1987 | St. Clair | 100/145 |

FOREIGN PATENT DOCUMENTS

| | | | |
|---|---|---|---|
| 8504837 | 11/1985 | World Int. Prop. O. | 100/117 |

*Primary Examiner*—Andrew M. Falik

*Attorney, Agent, or Firm*—Roberts, Spiecens & Cohen

[57] ABSTRACT

An apparatus for the compaction and reduction of liquid content in a material includes at least one floating helix (3) rotatable about its axis by drive means (4, 30) and disposed in a casing (2) which, at least along a portion of its extent in the longitudinal direction, completely encloses the helix. In conjunction with the discharge portion of the apparatus, the casing encloses the helix with slight play. Seen in the direction of movement of the material, the discharge portion includes a helix-free region most proximal the discharge opening of the casing, intended for the formation of a counter-pressure member which arrests the movement of the material. In this region, the helix is provided with an extension body (100) which reduces the available conveyor surface area. As a rule, the body is a cylindrical hollow body which as a rule is provided with drainage apertures.

19 Claims, 5 Drawing Sheets

A-A
B-B
C-C
2
3
3A
100
33
18
24
23
22
21
20
14
16
1
4
30
40

4
30
2
3
101
100a
100b
104a
104b
105
108
103
106
107
100a,b
F-F
E-E'
E+E
G-G

FLOATING SHAFTLESS HELIX SCREW PRESS

TECHNICAL FIELD

The present invention relates to an apparatus for compacting and reducing the liquid content of material mixtures which include, apart from liquid, rigid and elastic bodies of, for instance, different sizes, densities, elasticities, moisture content, etc., the apparatus including, first, at least one floating helix which, for conveying the material mixture, is rotated about its axis, the helix being disposed in a preferably enclosed casing, and, secondly, means cooperating with the helix which, during compaction of the material, further assists the reduction of the volume of the material and its liquid content.

BACKGROUND ART

Material mixtures of the type mentioned by way of introduction, and hereinafter abbreviated to material, need to be moved in many different contexts, for example in industrial operations, in municipal waste disposal etc. (slaughter house offal, residual products in food production, refuse, screenings from the purification of wastewater etc.). Enormous quantities of material of the above-disclosed, or similar types are handled daily and it is a matter of fact that such material cannot be handled without considerable problems. These problems are a result of the fact that the material is, for example, bulky, contains a high proportion of liquid, is slippery, is tacky etc., and is consequently difficult to grasp firmly. Consequently, for efficient handling, it is necessary to compact the material and reduce its liquid content. A considerable and seemingly intractible problem is also involved in removing residual material deposits from prior art plants for the operations contemplated above.

For compacting material of the above-outlined types, the prior art calls for the employment of hydraulically driven compactors (the material is compacted between press plates) or screw presses, the choice of equipment being adapted to suit the physical application in question. One drawback inherent in previously employed equipment is, however, that such equipment requires considerable space and is expensive. The hydraulic compactors operate intermittently, which causes problems in, for example, massive accumulation at the infeed end for the material, while the conventional screw presses are provided with a central shaft about which entangling material such as textiles, plastic sheeting, strips etc. become wound and thereby hinder the flow of material through the apparatus, with block plug formation as a result.

SUMMARY OF THE INVENTION

The present invention relates to an apparatus for compacting and reducing the liquid content in material, and in particular for the compaction and reduction of material mixtures of the types disclosed above. The apparatus according to the present invention meets the above-outlined wishes and obviates the above-disclosed drawbacks inherent in currently applied prior art technology. According to the present invention, use is made of a combination of a floating helix and a casing, which entails that the equipment is extremely compact, simple in its construction, operationally reliable, easy to clean and affords a steady and trouble-free conveyance and processing of the material. Depending on the operational context in which the apparatus is employed, the apparatus may be made to operate continuously or intermittently, it nevertheless applying that the degree of functional reliability is just as high irrespective of the choice of operational mode. Neither will the immediate environments suffer from any effects, since the apparatus affords the possibility of rendering the casing substantially completely enclosed. In certain physical applications, the apparatus is employed for the batchwise discharge of the material which is compacted and whose liquid content has been reduced.

The apparatus according to the present invention includes at least one floating helix which is disposed in a preferably enclosed casing, for example, U-shaped and/or circular cross-section. A prime mover for the rotation of the helix is disposed in association with that section of the casing where the material is fed into the combination of casing and helix, while in the other section of the casing, i.e. in association with the discharge portion of the casing, there is disposed a zone where the cross-section of the casing is such that the casing encloses the helix with slight play. Moreover, the casing is provided with an end region which is enclosed in the circumferential direction and is located in the geometric extension of the helix, but from which the helix proper is absent. There will hereby be formed a region in which the material is arrested and is compacted in that the casing, in this region, performs the function of a counterpressure member which counteracts the conveyance of the material by the helix.

According to the present invention, there is disposed, in the discharge portion of the casing, an elongate body fixed to the helix and disposed substantially in the axial direction thereof, the body as a rule protruding out from the helix in a direction towards the discharge opening. In one preferred embodiment of the present invention, the elongate body is substantially cylindrical. In certain embodiments, the elongate body is designed as a hollow body. As a rule, parts of this body are disposed in the central cavity of the helix in the region most proximal the free end of the helix. The hollow body is preferably provided with drainage apertures, for example designed as narrow conical slots which are, as a rule, disposed in the axial direction of the helix. As its end turned to face the infeed portion of the casing, the hollow body terminates with a wall whose purpose is to prevent material from being displaced into the cavity of the elongate body. As a result of the body, the thickness of the material layer is reduced in the compaction region, at the same time as the abutment surface of the material layer against its surroundings (casing and elongate body, respectively) is increased. Consequently, the forcing-out of liquid from the material will be facilitated and the compacted material will attain a high solids density.

In certain physical applications, the arresting function of the casing is supplemented, or at least to a certain degree is replaced, by special counterpressure members which, in cooperation with the casing, amplify or, to a certain extent, actually realize the arresting effect. In the above-mentioned zone and/or in the end region, there thus takes place a compaction of the material during simultaneous reduction of the liquid content of the material. In certain embodiments of the present invention, the compaction is further amplified in that the helix is provided with reducing pitch. The helix is completely free, i.e. is not journalled in that end which is directed towards the discharge portion of the casing. Since the helix has a certain degree of elasticity in the radial direction, it will abut against the casing during its rotation, unless material which is in the process of being conveyed during certain—generally brief—periods prevents such abutment. On the other hand, the helix is extremely stable in its axial direction and thereby retains substantially its original length even against the counterpressure which is generated from the material under compaction.

In one embodiment of the present invention, a spring-biased counterpressure plate constitutes one form of the above-disclosed special counterpressure members. The plate is shown journalled in the upper bounding surface of the casing and/or in association with the discharge opening of the casing. In certain embodiments of the present invention, the counterpressure plate is disposed in a receptacle chamber. In other embodiments, the arresting effect of the casing on the material is amplified in that the inner cross-sectional area of the casing is reduced most proximal the discharge opening.

In still a further embodiment of the present invention, the counterpressure member consists of a receptacle device shiftable in the axial direction of the casing, for example, in the form of a container. a hose etc. During rotation of the helix, the material is moved into the receptacle device, the material displacing the receptacle device in the axial direction of the helix.

In yet a further preferred embodiment of the apparatus according to the present invention, the counterpressure member consists of a floating helix disposed in a casing, this casing having an infeed opening connected to the discharge opening of the issuing casing. In this instance, the orientation of the casing which issues the material is such that its axis is directed towards the centre axis of the helix in the receiving combination of casing and helix. As a rule, the discharge opening is, here, provided with a coupling member which connects to a coupling member disposed on the infeed opening, both of these coupling members being rotatably journalled in one another for simple adjustment of the relative orientation of the two casings. That end region where there is no helix proper is, in certain physical applications, very short and its length has been selected so as to ensure that the two helixs do not come into contact with one another during their rotation.

In certain physical applications in which a number of casings—each one provided with a floating helix - are interconnected, only the last helix, located in the direction of travel of the material, is provided with the elongate body, while in other physical applications, one such body connected to the helix is provided in association with one, several, or all transitions between interconnected helixes. There are also physical applications of the present invention in which all helixes included in the apparatus are provided with the elongate body. In such an instance, the dimensioning and disposition of each respective elongate body are selected in view of the composition and consistency of the material passing through the apparatus. so as, on each compaction occasion, to adapt, for example, the TS of the material to suit subsequent transport and/or compaction procedures and stages.

The diameter of the casing of the receiving oombination is, together with the pitch, speed of rotation and/or radial extent of the helix vanes of the receiving combination of casing and helix, adapted so as to realize an arrest of the material travel before the material arrives at the discharge opening of the issuing casing. It is hereby possible to attain a substantially complete filling of the space in the receiving casing. This substantially complete filling is a prerequisite to be able to transport the material upwardly in a more or less vertical direction. Thus, according to the present invention, it is possible to cause the axis of the receiving combination to be directed, for example, horizontally, vertically or at any interjacent point.

The casing is provided with drainage apertures, for example foraminations, longitudinal slots etc., which are preferably located in that region of the casing where compaction of the material takes place. According to the present invention, orientation of the casing is advantageously selected such that the discharge portion of the casing is located higher than its infeed portion, whereby liquid squeezed out during the compaction operation is conveyed in a direction opposite to the direction of travel of the material and is drained out from the casing through the above-mentioned drainage apertures.

BRIEF DESCRIPTION OF THE ACCOMPANYING DRAWINGS

The nature of the present invention and its aspects will be more readily understood from the following brief description of the accompanying drawings, and discussion of a number of embodiments relating thereto.

In the accompanying drawings

FIG. 1 shows an axial section through a fundamental apparatus according to the present invention, the apparatus including a casing enclosing a floating helix with one substantially free end and an elongate body united to the free end;

FIGS. 1*a*–*c* are sections taken along the lines A—A, B—B and C—C in FIG. 1;

FIG. 2 diagrammatically shows the material distribution in the longitudinal direction of the apparatus according to the present invention;

FIGS. 3–5 diagrammatically illustrate embodiments of the apparatus in which this apparatus is provided with supplementary, special counterpressure members to compact the material on its movement;

FIGS. 6*a*–*b* are partial sections through embodiments of the apparatus in which this apparatus is provided, in conjunction with its discharge opening, with a shiftable receptacle device;

FIGS. 7*a*–*b* are partial sections through one embodiment of the apparatus in which this apparatus cooperates, in conjunction with its discharge opening, with a conveyor device which includes a casing enclosing a floating helix;

FIGS. 8*a*–*b* are axial sections illustrating examples of the arrangement of the elongate body in its end facing the infeed portion of the apparatus;

FIG. 8*c* a magnification of the section E′—E′ of FIG. 8*b:*

FIG. 8*d* shows a magnification of the sections F—F of FIGS. 8*a* and 8*b;*

FIG. 8*e* shows a magnified detailed illustration from the encircled portion of FIG. 8*d;*

FIG. 8*f* is a section taken on line E—E in FIG. 8*a;*

FIG. 8*g* a side elevation of a magnified detailed illustration of the elongate body according to FIG. 8*a*; and FIG. 8*h* is a the section G—G in FIG. 8*g*.

DESCRIPTION OF PREFERRED EMBODIMENTS

Figures 1, 1A, 1B, 1C, 2:
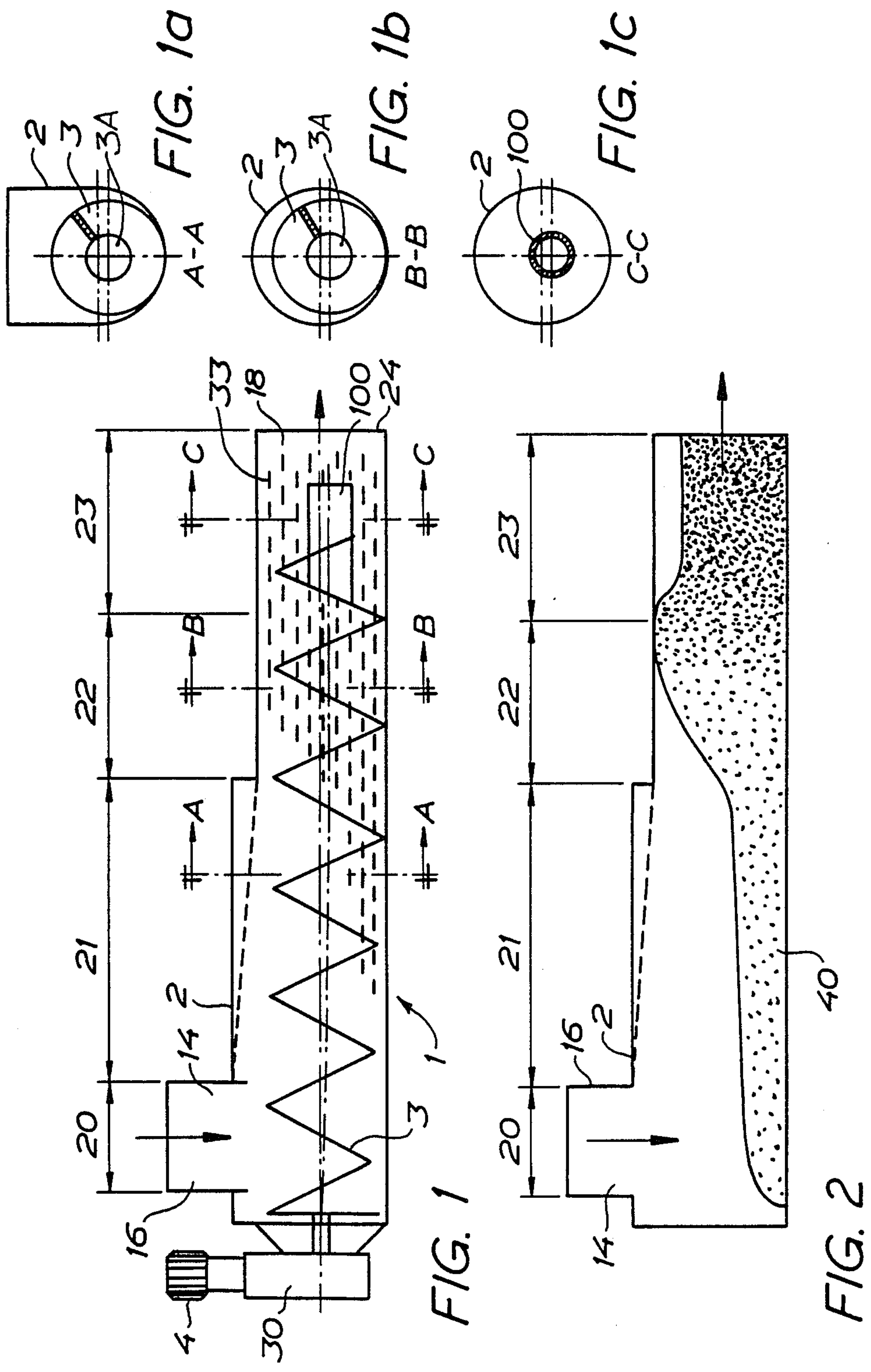

Referring to the drawings, FIGS. 1–2 illustrate the present invention in one embodiment which shows the fundamental construction and function of the invention. In the figures, there is shown an apparatus 1 which includes an elongate, fistular casing 2 in which is disposed a floating shaftless helix 3. At its one end, the casing is provided with an infeed opening 14 which is connected to an upwardly directed drum 16. By the intermediary of a gearing and journalling unit 30, a motor 4 drives the helix 3. The other end of the casing constitutes the discharge portion 18 of the apparatus, this portion being provided with a discharge opening 24. The helix is solely journalled in conjunction with that end of the casing where the gearing and journalling unit is disposed, while the other end of the helix, which is directed towards the discharge portion, is completely free, which entails that, in this region, the helix does not rest in a bearing or journal of any kind, but, as a rule, abuts with its outer defining surface against the inner surface of the casing in a region which is restricted in the circumferential direction. The shaftless helix 3 is formed by a continuous spirally wound blade extending substantially radially in the casing to define a central passage 3A extending longitudinally over the length of the helix. The passage 3A forms a hollow portion symmetrical with the rotational axis of the helix and through which the material passes. The reference numeral 3B in FIG. 1*a* shows the inner blade edge which defines the perimeter of the passage 3A. An elongate body 100 is disposed in association with the end of the helix directed towards the discharge portion, the body being fixedly retained on the helix and being substantially disposed in the axial direction thereof in continuation with the central passage 3A of the helix and axially thereof. In one preferred embodiment of the apparatus according to the present invention, the body is substantially cylindrical. In the embodiment shown in FIG. 1 the body 100 is partly circumscribed by the helix. FIG. 1*c* shows that the outer diameter of the body 100 substantially corresponds to the outer diameter of the passage 3A found in the helix.

Seen in the axial direction of the casing, the combination of helix and casing is divided into an infeed zone 20, a precompaction zone 22 and a compaction zone 23. In certain physical applications, the apparatus according to the present invention is employed, not only for compaction, but also for conveyance of the material along the distance of travel required for such compaction. In such an instance, there is further provided a conveyor zone 21 whose length is, naturally, determined by the desired travel distance. By the provision, in certain physical applications, of drainage apertures also in the conveyor zone of the casing, there will beoobtained a pre-reduction of the liquid content of the material mixture before the mixture passes into the pre-compaction and compaction zones. In certain physical applications, a conveyor zone is also nominally provided after the compaction zone.

Cross-sections through each respective zone in the illustrated embodiment are apparent from FIGS. 1*a–c*. It will be appreciated from these figures that the cross-section of the casing in the precompaction zone is substantially circular, and encloses the helix with slight play. FIG. 1 also indicates by a solid line a relatively abrupt transition between the conveyor zone 21 and the pre-compaction zone 22. However, for certain physical applications, the embodiment illustrated by broken lines, with a relatively continuous transition between the cross-sections of the conveyor zone and the pre-compaction zone is selected. In those physical applications where no specific conveyor zone is provided, the above-mentioned transitions are disposed between the infeed zone and the pre-compaction zone.

FIG. 1 also shows how, in certain embodiments of the apparatus according to the present invention, the casing 2 is provided with drainage apertures 33. As a rule, the drainage apertures are only provided in the lower portion of the path of travel, as regards the infeed zone 20 and conveyor zone 21 of the casing, but substantially throughout the circumference of the casing in its pre-compaction zone 22 and its compaction zone 23.

FIG. 2 shows in particular how the material flow 40 occupies a relatively small portion of the cross-section of the casing as long as the material is located in the conveyor zone 21, and how the material, during its passage through the pre-compaction zone, occupies a steadily increasing proportion of the cross-section of the casing in order, as a rule, to substantially take up all of the available conveyor space in the compaction zone.

Figure 3:
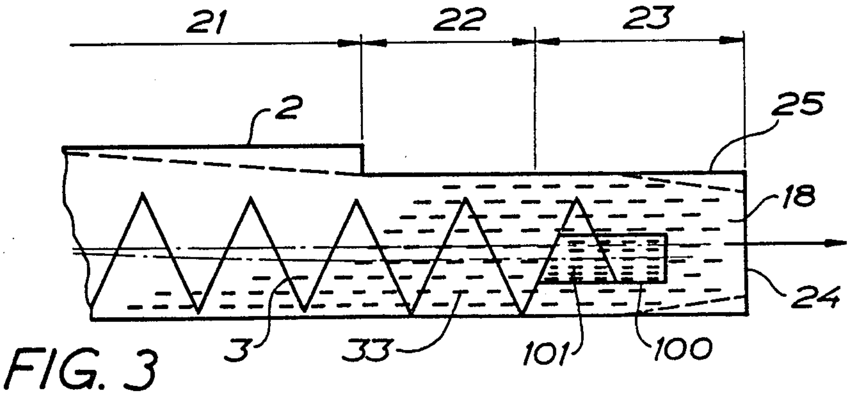

In the embodiment of the apparatus accrding to the present invention shown in FIG. 1 the movement of the material is arrested and compaction is effected in that the available space for movement of the material is considerably reduced by the body 100. FIGS. 3–4 show how the combination of helix and casing is moreover provided with supplementary counterpressure members 25, 8*a*, 8*b* to further arrest the movement of the material in the compaction zone 23 of the casing. In certain physical applications, this arrest effect is amplified in that the inner cross-section of the casing is reduced in the region of the compaction zone 23, this feature being marked by broken lines in FIG. 3.

Figure 4A:
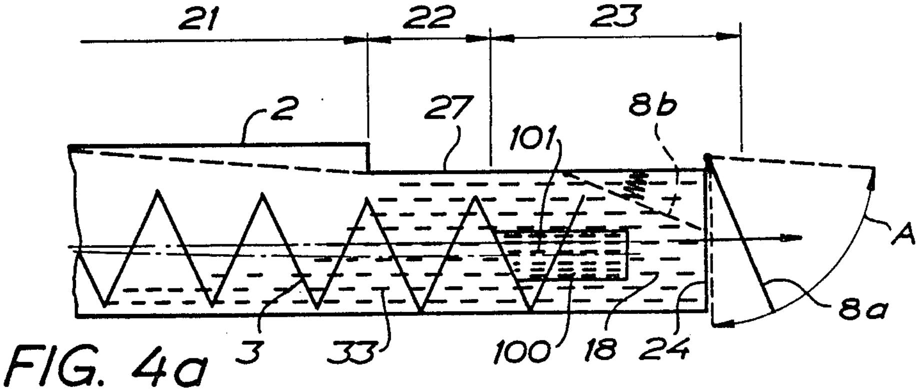

FIG. 4*a* illustrates one embodiment in which the counterpressure member consists of counterpressure plate 8*a* disposed in association with the discharge opening 24 and rotatably journalled at the upper region of the discharge opening and movable in the direction of the double-headed arrow A: and also an embodiment in which the counterpressure member consists of counterpressure plate 8*b* which is rotatable and preferably return spring-biased in the upper bounding surface 27 of the casing 2.

Figure 4B:
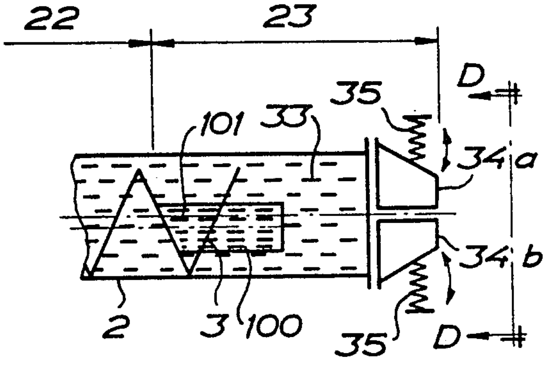
Figure 4C:
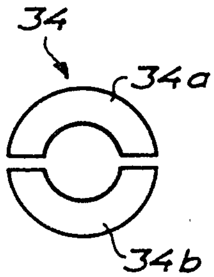

FIG. 4*b* is a partial longitudinal section, and FIG. 4*c* a view taken along the line D—D in FIG. 4*b*, of one embodiment in which the counterpressure member consists of a divisible cone 34. The cone consists of, for example, two halves 34*a,b* and is opened against the action of springs 35 whose spring force is adapted to provide that counterpressure which is required in order to attain the contemplated compaction of the material.

Figure 5:
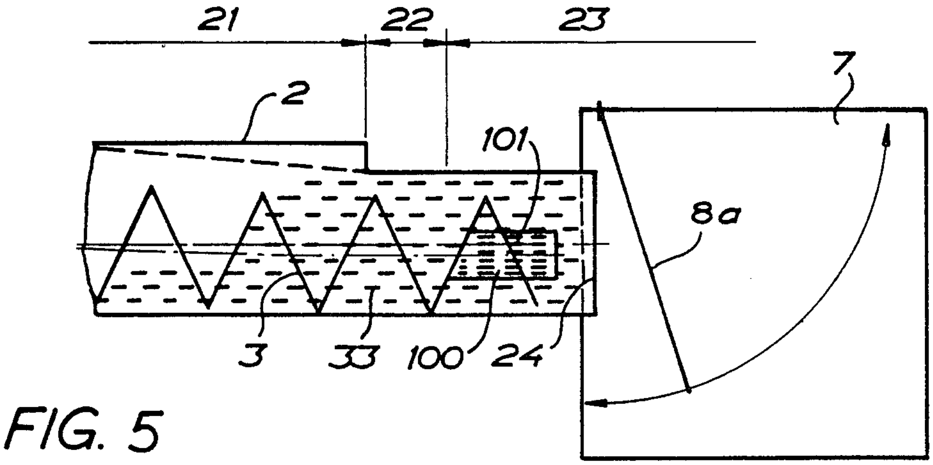

FIG. 5 shows an embodiment in which the counterpressure plate 8*a* is, in association with the discharge opening 24, disposed in a receptacle chamber 7. In the embodiment shown in this Figure, the counterpressure plate is journalled in the upper bounding surface of the chamber, but the journalling may, for example, correspond to that provided in the embodiments disclosed in FIGS. 4*a,b*.

Figure 6A:
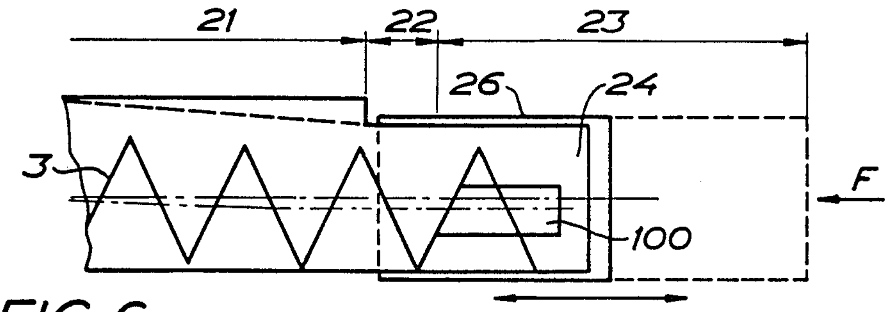
Figure 6B:
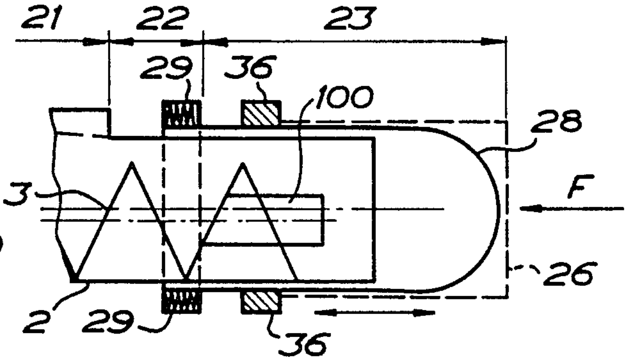

FIGS. 6*a–b* illustrate embodiments of the apparatus according to the present invention in which the counterpressure member consists of a receptacle device 26, 28, shiftable in the axial direction of the casing, this device comprising, in FIG. 6*a* a container 26, and in FIG. 6*b*, a hose 28. In the latter instance, the hose 28 is paid out from a magazine 29. In certain embodiments, brake means 36 are provided so as to brake the paying-out of the hose from the magazine. In the Figures, an arrow F indicates a force which is counter-directed to the movement of the container. The arrow represents a counterpressure member, for example a hydraulic cylinder ram. FIG. 6*b* illustrates that, in certain embodiments, the hose 28 cooperates with the container 26 (broken lines) and is brought into abutment against the inner surfaces of the container as the hose is filled with material from the casing.

Figure 7A:
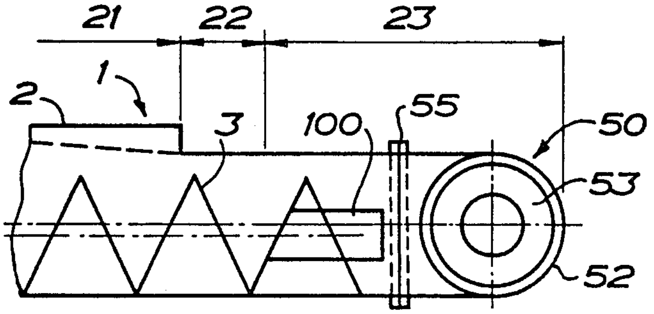
Figure 7B:
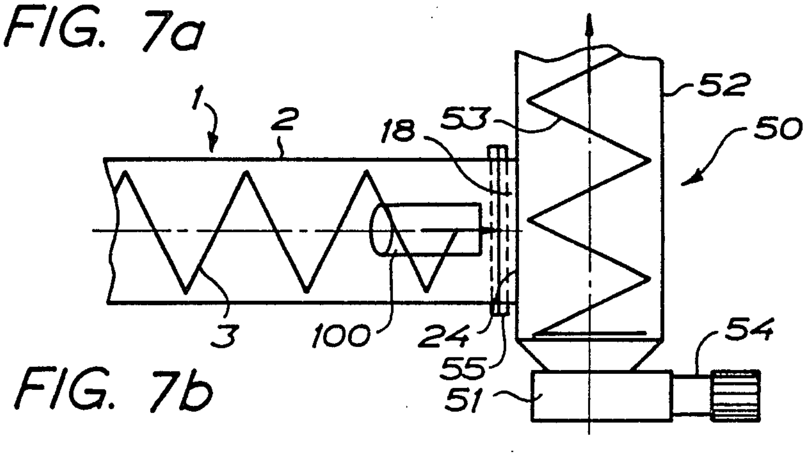

FIGS. 7*a,b* illustrate one embodiment of the present invention in which the apparatus 1 includes at least one supplementary combination of casing and helix, for example forming a conveyor means 50 including a casing 52 and a floating helix 53 disposed therein. The helix is driven through a motor 54 by the intermediary of a gearing and journalling unit 51 and its speed is, thus, adjustable by gear change to the desired level. The direction and alignment of the first helix 3 and/or a center axis of the discharge end 18 of the casing are trained towards the center axis of the helix 53 of the conveyor combination, As a rule, the opening area of the discharge opening 24 of the casing 2 corresponds to the cross-sectional area of the receiving casing 52 and the two casings are substantially sealingly interconnected. In one preferred embodiment. the two casings 2 and 52, respectively, are interconnected by the intermediary of couplings 55 which are of circular cross-section, whereby any casings may be rotated to the desired mutual orientation. The conveyor apparatus 50 is, in certain embodiments, operative to move the material substantially horizontally, while in other embodiments, this movement takes place while the level of the material changes. There are also embodiments of the present invention in which the casing 52 of the conveyor apparatus 50 with the helix placed therein is directed substantially vertically. In such an instance, the free end of the helix is trained upwardly. In certain physical applications, the elongate body 100 of the first helix 3 is replaced by or supplemented with a corresponding body on the subsequent helix 53 depending upon the composition and consistency of the material passing through the apparatus.

Figures 8A, 8B, 8C, 8D, 8E, 8F, 8G, 8H:
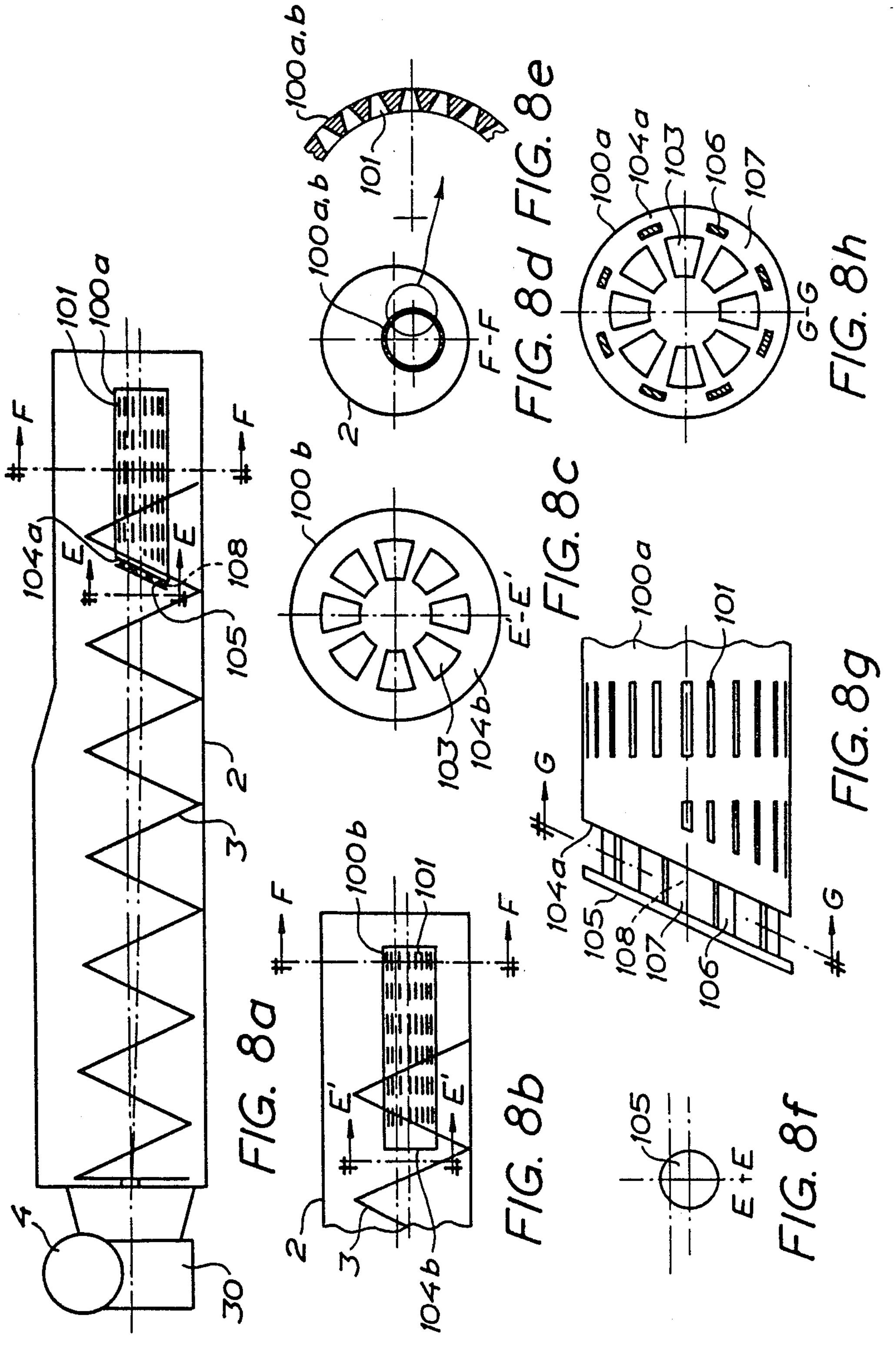

FIGS. 8*a* and 8*b* illustrate alternative embodiments of the elongate body 100*a,b* in which the body has, in one embodiment, an abrupt termination 104*b* facing the infeed end, and, in the other embodiment, an oblique termination 104*a*, the oblique inclination corresponding to the pitch of the helix. These figures show that embodiment in which the elongate body is designed as a hollow body provided with drainage apertures 101. While the combination of casing and helix is shown in these figures without connection to any supplementary counterpressure member, it will be obvious to the skilled reader of this specification that such connection is established in certain physical applications, for example, in association with a supplementary conveyor apparatus, according to that illustrated in FIGS. 7*a,b*.

It will be apparent from FIG. 8*c* that the termination of the elongate body 100*a,b*, facing the infeed end consists of an end plate 104*b* provided with apertures 103, the end plate substantially preventing material from being moved into the cavity of the body. The size of the apertures is selected in view of the size of the bodies and particles included in the material.

FIGS. 8*d,e*, show an embodiment of the drainage apertures 101 of the elongate body, these being shown as conical slots with their major opening area facing the center axis of the elongate body. FIGS. 8*f–h* show a preferred embodiment of that termination which the elongate body 100*a* turns to face towards the infeed end of the apparatus (counter to the material flow). This embodiment is particularly intended for use when minute bodies (particles) are borne in the material flow and may risk penetrating into the inner cavity of the elongate body. The elongate body is provided with a baffle plate 105 which is not provided with apertures and is located outside the end plate 104*a*.

By connecting means 106, the baffle plate is connected to the elongate body, the connecting means holding the baffle plate fixed in spaced-apart relationship to the end plate such that there is formed a substantially columnar space 108 between the end plate and the baffle plate. The connecting means are designed such that the columnar space is exteriorly accessible through apertures 107 in the connecting means or therebetween. The inner cavity of the elongate body is hereby placed in communication with its ambient surroundings by means of the apertures 103 in the end plate 104*a*, the columnar space 108 and the apertures 107 in or between the connecting means 106.

Material fed into the apparatus 1 through the infeed opening 14 in the casing 2 is moved by rotation of the helix in a direction towards the discharge opening 24. As is apparent from FIG. 2, material accumulates in the pre-compaction zone 22 either in that the helix 3 has, in certain embodiments, lower pitch than that prevailing in the conveyor zone 21, or in that the movement of the material is arrested in the compaction zone 3 because of the reduced conveyor surface area, and, in certain physical applications, because of the action of the counterpressure members 8, 25, 26, 28, and 50. As a result, the material, as a rule, fills out substantially all of the available conveyor space in the compaction zone.

It will be apparent to the skilled reader of this specification and the accompanying drawings that a considerable reduction of the cross-sectional area takes place of that region through which the material may pass when the material is moved into the space between the body 100 and the casing 2. The combination of the elongate body and the casing thereby constitutes an efficient arrest device which entails that the material is compacted and liquid is forced out from the material. By making the elongate body hollow in certain embodiments, and by providing this body with drainage apertures, the distance can be reduced from the central material portions which are under compaction and those regions from which liquid may be removed. As a result, a highly efficient drainage of liquid from the material will be achieved.

In FIGS. 3–5, the braking effect on the movement of the material in the compaction zone 23 by friction against the inner wall of the casing and against the elongate body 100 is supplemented by an additional braking effect by the action from the counterpressure plates 8*a,b* (FIGS. 4, 5) or by reduction of the cross-sectional area of the casing (FIG. 3), or alternatively in that the casing is terminated by the cone 34 (FIG. 4*b*). By this reduction of available conveyor space, the material is placed under pressure and the friction (braking effect) on the movement of the material is increased.

On movement of material into the container 26 or into the hose 28 (Cf. FIGS. 6*a,b*) the container, hose—or alternatively hose in combination with container—is progressively forced out from the casing 2 by the action of forces from the material and against the counteraction of the forces designated F, whereby the material will retain the reduced volume occasioned by the earlier compaction, or, alternatively, be further compacted above and beyond the compaction previously attained.

In the embodiment of the present invention illustrated in FIGS. 7*a,b,* the conveyor apparatus 50 constitutes a counterpressure member in that the dimensions, pitch and speed of rotation of the casing 52 and the helix 53, respectively, have been selected such that the material is arrested on its passage out from the discharge opening 24 of the casing 2. Hereby, the desired compaction of the material will be attained when the material is in the casing 52 of the receiving combination, and thereby requisite filling of the casing of the receiving combination.

The above-described special (supplementary) counterpressure members are combined in certain embodiments, such that, for example, one and the same apparatus may include a counterpressure plate 8*a,b* and a terminating conical portion of the casing: a counterpressure plate 8*a,b,* and a shiftable receptacle device 26, 28; a cone 34 and a receiving casing 52 with its helix 53, and so on.

In the illustrated embodiments and physical applications of the present invention, arrest of the movement of the material in the compaction zone is effected to such a considerable extent that. at least in the area most proximal the discharge opening 24, the casing is as good as completely filled with material. The thus compacted material is thereafter caused to leave the casing through its discharge opening in batches whose size is determined by the rotation of the helix (that angular displacement which the helix undergoes) in conjunction with each discharge occasion. Thus, the present invention affords a simple and reliable technology for the relatively accurate batchwise discharge of material from an apparatus according to the present invention.

As is apparent from the drawing figures, the elongate body 100 is disposed, in certain physical applications, to terminate a distance from the discharge opening of the casing, while, in other physical applications, terminating substantially flush with the discharge opening. This atter embodiment is particularly well-suited for the batchwise discharge of material as disclosed in the preceding paragraph, and in which the volume of material discharged on each individual discharge occasion is to be substantially of equal size.

In many embodiments and examples of physical application, the casing 2 is disposed such that the material is moved slightly upwardly on its passage in a direction towards the discharge opening 24. Drainage of the material will be hereby facilitated, since a portion of the liquid passes in a direction counter to the direction of movement of the material and, substantially in the center of the floating helix, before the liquid runs out through the drainage apertures 33. The liquid will hereby be enabled to reach the drainage apertures of the casing in a region where the material has not yet been compacted to any appreciable degree.

It will be clear to those skilled in this art that, by the choice of materials described by way of introduction for the helix, entailing that the helix is mechanically highly stable in its axial direction while possessing such mobility and elasticity in its radial direction as to abut against the casing at least in its lower regions, the effect will be achieved that lhe combination of helix and casing will be self-cleaning. Such is also the case for those drainage apertures as are disposed in the casing and which, as a rule, are designed in a manner corresponding to that described above in conjunction with the design of the drainage apertures of the elongate body. Similarly, the mobility in a radial direction eliminates tendencies towards plug-formation, in that the helix is able to "clamber" against the wall of the casing when material has accumulated on the bottom of the casing. As a result, the effect will be attained, during the continued rotation of the helix, that such material accumulations are progressively worn down and are moved towards the discharge opening of the apparatus. In the reduction of the present invention into practice, considerable improvements have been achieved in tests of the liquid drainage up to the order of magnitude of from 50 to 70% in relation to that which has been possible to attain using a floating helix and without the employment of the elongate body. In experiments, material mixtures of a solids content of less than 5% have been drained of liquid to the extent that the solids content of the material leaving the apparatus increased to from 75 to 80%.

The above detailed description has referred to but a limited number of embodiments of the present invention. but it will be readily perceived by those skilled in this art that the present invention accommodates a considerable number of conceivable embodiments without departing from the spirit and scope of the appended claims.

What is claimed is:

1. An apparatus for the compaction and reduction of liquid content in a material in which the apparatus includes a floating, shaftless helix with a hollow center (3, 53) rotatable at one end about its axis by drive means at said one end of the helix, said helix being disposed in a casing (2, 52) which, at least along a part of its extent in the longitudinal direction, wholly encloses the helix, said casing including an infeed portion and a discharge portion with a discharge opening, the casing surrounding, in the region of the discharge portion, the helix with slight play, and also embracing a region most proximal the discharge opening of the casing where no helix is present, for the formation of a compaction zone in which movement of the material is resisted, said apparatus further comprising in the discharge portion of the casing, an unsupported elongate body (100) fixed to the helix and extending aubstantially in the axial direction thereof to arrest the movement of said material, said shaftless helix comprising a continuous blade wound spirally at a determined pitch, said blade extending substantially radially in said casing and having a radial extent to form said hollow center with an open central axial passage longitudinally along the length of said helix for passage of said material therethrough, wherein the perimeter of said hollow center is defined by said continuous spiral blade at the inner edge thereof, said elongate body extending in continuation of said axial passage axially thereof.

2. An apparatus as claimed in claim 1, wherein said body (100) protrudes from the helix in a direction away from the infeed portion of the casing.

3. The apparatus as claimed in claim 1 wherein said elongate body (100) is partly circumscribed by the helix.

4. The apparatus as claimed in claim 3, wherein outer diameter of the body (I00) substantially corresponds to the inner diameter of the floating helix.

5. The apparatus as claimed in claim 1 wherein the elongate body (100) is a hollow body provided with drainage apertures (101), the casing (2) being provided with drainage apertures (33).

6. The apparatus as claimed in claim 1 wherein said elongate body is cylindrical.

7. The apparatus as claimed in claim 1 comprising a counter-pressure member proximate the discharge opening of the casing.

8. The apparatus as claimed in claim 7, wherein the counter-pressure member is constituted by a container (26), shiftable in the axial direction of the casing; and a retractible hose (28) for displacing the container in the axial direction of the casing.

9. The apparatus as claimed in claim 8 wherein said hose surrounds the container.

10. The apparatus as claimed in claim 8 wherein said hose is inserted into said container.

11. The apparatus as claimed in claim 7, wherein the counterpressure member consists of a device (50) which includes a second floating helix (53) disposed in a casing (52), the discharge opening (24) connecting substantially sealingly to an infeed opening of the device (50) and having an opening surface area substantially corresponding to the cross-sectional area of the casing (52) of the device (50).

12. The apparatus as claimed in claim 11, wherein the pitch, speed of rotation and radial extent of helix vanes of the helix (53) disposed in the casing (52) are adapted so as to realize an arrest effect on the material movement in said compaction zone.

13. The apparatus as claimed in claim 7 wherein said counter-pressure member comprises a pivotal spring biased plate connected with said casing at the upper surface thereof.

14. The apparatus as claimed in claim 7 wherein said counter-pressure member comprises a pivotal spring-biased plate connected to said casing to open outwards of said discharge opening.

15. The apparatus as claimed in claim 7 wherein said counter-pressing member comprises a pressure yieldable throttle means including a cone yieldably opening against spring action.

16. The apparatus as claimed in claim 7 comprising a receptacle chamber in which said counter-pressure member is disposed.

17. An apparatus as claimed in claim 1 wherein said elongate body is hollow and communicates with said axial passage in said helix, said elongate body being provided with apertures.

18. An apparatus as claimed in claim 17 wherein said elongate body has an outlet end remote from the helix, said outlet end being at a higher level than the end of the hollow body which communicates with the axial passage in said helix.

19. The apparatus as claimed in claim 1 wherein said discharge portion is located at a level higher than said infeed portion.

* * * * *